United States Patent [19]

Kitamura

[11] Patent Number: 5,338,014
[45] Date of Patent: Aug. 16, 1994

[54] JIG FOR ASSEMBLING WIRE HARNESS

[75] Inventor: Tsutomu Kitamura, Kanazawa, Japan

[73] Assignee: Sumitomo Wiring Systems, Ltd., Yokkaichi, Japan

[21] Appl. No.: 105,943

[22] Filed: Aug. 13, 1993

[30] Foreign Application Priority Data

Sep. 11, 1992 [JP] Japan ............... 4-063713[U]

[51] Int. Cl.⁵ ............................................. B23Q 1/04
[52] U.S. Cl. .................. 269/47; 269/254 CS;
  269/303; 269/317; 269/310; 269/903
[58] Field of Search .................. 140/92.1; 29/755, 850,
  29/760; 324/158 F; 269/47, 303–305, 315, 316,
  309, 310, 903, 266, 254 R, 254 CS

[56] References Cited

U.S. PATENT DOCUMENTS

| | | | |
|---|---|---|---|
| 477,098 | 6/1892 | Brown et al. | 269/254 R |
| 2,521,505 | 9/1950 | Doyle | 269/310 |
| 4,337,934 | 7/1982 | Caveney | 269/903 |
| 4,566,502 | 1/1986 | Kellogg | 269/903 |
| 4,733,462 | 3/1988 | Kawatani | 269/903 |
| 4,793,603 | 12/1988 | Wober et al. | 269/303 |
| 4,877,228 | 10/1989 | Ripert | 269/903 |
| 5,224,586 | 7/1993 | Naka et al. | 269/266 |

FOREIGN PATENT DOCUMENTS 1-39047  11/1989  Japan .
2-2019    1/1990  Japan .

OTHER PUBLICATIONS

English language translation of the claim of Japanese Utility Model Publication No. 1-39047.

Primary Examiner—Robert C. Watson
Attorney, Agent, or Firm—Sandler Greenblum & Bernstein

[57] ABSTRACT

A wiring guide bar extending vertically through a protector case and projecting from the upper end thereof is vertically movably supported by an elastic member. In installing a protector cover on the protector case, the elastic member is compressed to locate the upper end of the wiring guide bar below the upper end of the protector case.

7 Claims, 6 Drawing Sheets

JIG FOR ASSEMBLING WIRE HARNESS

BACKGROUND OF THE INVENTION

1. Field of the Invention

The present invention relates to a jig for assembling a wire harness and more particularly to a jig, for installing a protector on the wire harness, to be installed on a wiring base in combination with other jigs.

2. Description of the Related Arts

The wire harness is used to connect a plurality of measuring instruments and lamps to a power supply of a car, a construction machine, a household electric appliance, and the like. It is necessary to cover the wire harness with a protector normally made of resin so as to protect it against damage or breakage.

In assembling the wire harness, various jigs are installed on the surface of the substrate of a wiring base so as to distribute electric wires as designed. The jigs are used to wire electric wires along the jigs, install protecting/installing parts such as a protector, grommet and the like on the wire harness comprising bundled electric wires or mount connecting parts such as a connector on electric wires branching from the wire harness.

As proposed by the present applicant and disclosed in Examined Japanese Patent publication No. 1-39047, in installing the protector on the wire harness, a fixing jig for holding a protector case is used in combination with a jig for projecting a wiring guide rod (pin) into the protector case from an opening formed thereon. That is, electric wires inserted into the protector case held by the fixing jig are wired along the wiring guide rod extending through the protector case. Then, the protector cover is mounted on the protector case so that the protector cover encloses and protects the electric wires.

The jigs facilitate the operation for positioning the protector cover and wiring electric wires. In mounting the protector cover on the protector case, held by the fixing jig, in which the electric wires have been wired, the upper end portion of the wiring guide rod projecting upward from the upper surface of the protector cover prevents the protector cover from being easily installed on the protector case.

The above-described problem can be solved by providing a wiring guide rod lower than the upper surface of the protector case. But in that case, it is necessary to wire the electric wires along the wiring guide rod disposed in the protector case. Thus, the wiring operation is performed with inefficiency.

Therefore, conventionally, electric wires are wired along the wiring guide rod projected from the upper surface of the protector case. After the electric wires are wired, the electric wires are pressed downward to move the electric wires downward along the wiring guide rod so as to dispose the electric wires inside the protector case.

Since the wiring guide rod projects from the upper surface of the protector case, the protector cover cannot be mounted on the protector case held by the fixing jig. Therefore, the protector cover is mounted on the protector case after the protector case is removed from the fixing jig.

This way of installing the protector cover on the protector case causes an inefficient wiring operation and an unfavorable productivity because various jigs are on the wiring base.

SUMMARY OF THE INVENTION

It is an object of the present invention to provide a jig, for assembling a wire harness, which allows a protector cover to be installed on a protector case without removing the protector case from the jig so as to efficiently install the protector cover on the protector case.

In accomplishing these and other objects, there is provided a jig, for assembling a wire harness, disposed on a wiring base in combination with a protector-fixing jig, comprising a wiring guide rod inserted into a protector case from an opening formed on a protector case removably held by the protector-fixing jig. The wiring guide rod is elastically supported to project an upper end portion of the wiring guide rod from an upper surface of the protector case; and moved downward to locate the upper end of the wiring guide rod below the upper surface of the protector case when the wiring guide rod is pressed downward by a protector cover in installing the protector cover on the protector case in which electric wires have been bundled.

The jig comprises a supporting rod standing vertically at a predetermined position of the wiring base; a guide cylinder integrated with the supporting rod or removably fixed thereto and projecting from the supporting rod; a wiring guide rod, connected with a stopper which moves vertically in sliding contact with the inner peripheral surface of the guide cylinder, an upper portion of which projects from the upper end of the guide cylinder; an elastic member, disposed inside the wiring guide rod, for urging upward the stopper disposed at the lower end of the wiring guide rod.

It is possible to integrate the guide cylinder and the wiring guide rod with each other and install the guide cylinder on the supporting rod so that the guide cylinder moves in sliding contact with the supporting rod. The elastic member is interposed between the wiring guide rod integrated with the guide cylinder and the supporting rod so that the elastic member urges the wiring guide rod integrated with the guide cylinder. The wiring guide rod integrated with the guide cylinder is moved downward when the wiring guide rod is pressed downward by the protector cover in installing the protector cover on the protector case.

The elastic member positioned urges the wiring guide rod upward, thus disposing the upper end of the wiring guide rod high above the upper end surface of the protector case. When the wiring guide rod is moved downward by the force applied to the protector cover in installing the protector cover on the protector case, the upper end of the wiring guide rod is positioned below the upper end surface of the protector case.

As the elastic member, a compression spring, elastic rubber comprising urethane rubber, an air cylinder or the like is preferably used provided that the elastic member urges the wiring guide rod and compressed in a required distance when the wiring guide rod is pressed downward by the protector cover.

In order to prevent the wiring guide rod from being inclined by the tensile force of electric wires of a wire harness wired in the protector case when the protector cover presses the wiring guide rod downward, it is preferable that a sliding guide portion is formed on the lower end of the wiring guide rod. The provision of the sliding guide portion allows the wiring guide rod to move downward without being inclined in sliding contact with the inner peripheral surface of the guide cylinder.

The vertical thickness of the upper portion of the guide cylinder is set to be great. Two openings are formed in the upper portion of the guide cylinder so as to prevent the wiring guide rod from inclining in the downward movement thereof in sliding contact with the inner peripheral surface of the two openings.

According to the above construction, the wiring guide rod projecting the upper end surface of the protector case is moved downward by the force applied to the protector cover in installing the protector cover on the protector case. Thus, the protector cover can be installed on the protector case without removing the protector case from the jig. Accordingly, the protector cover can be easily installed on the protector case in a short period of time and with efficiency.

The construction of the jig is simple. That is, the wiring guide rod is elastically supported at the upward position and can be moved downward a distance enough for the protector cover to be appropriately brought into contact with the protector case. In addition, component parts of the jig can be easily obtained at low costs.

BRIEF DESCRIPTION OF THE DRAWINGS

These and other objects and features of the present invention will become clear from the following description taken in conjunction with the preferred embodiments with reference to the accompanying drawings, in which.

DETAILED DESCRIPTION OF THE INVENTION

Before the description of the present invention proceeds, it is to be noted that like parts are designated by like reference numerals throughout the accompanying drawings.

A jig for assembling a wire harness according to an embodiment of the present invention is described below with reference to FIGS. 1 through 4.

FIGS. 1 through 4 show a protector (cover)-installing jig according to the embodiment of the present invention. The jig comprises a wiring base 1; a protector (cover)-fixing jig 2 projecting from the upper surface 1a of the wiring base 1; and a wiring guide jig 3.

Figure 2:
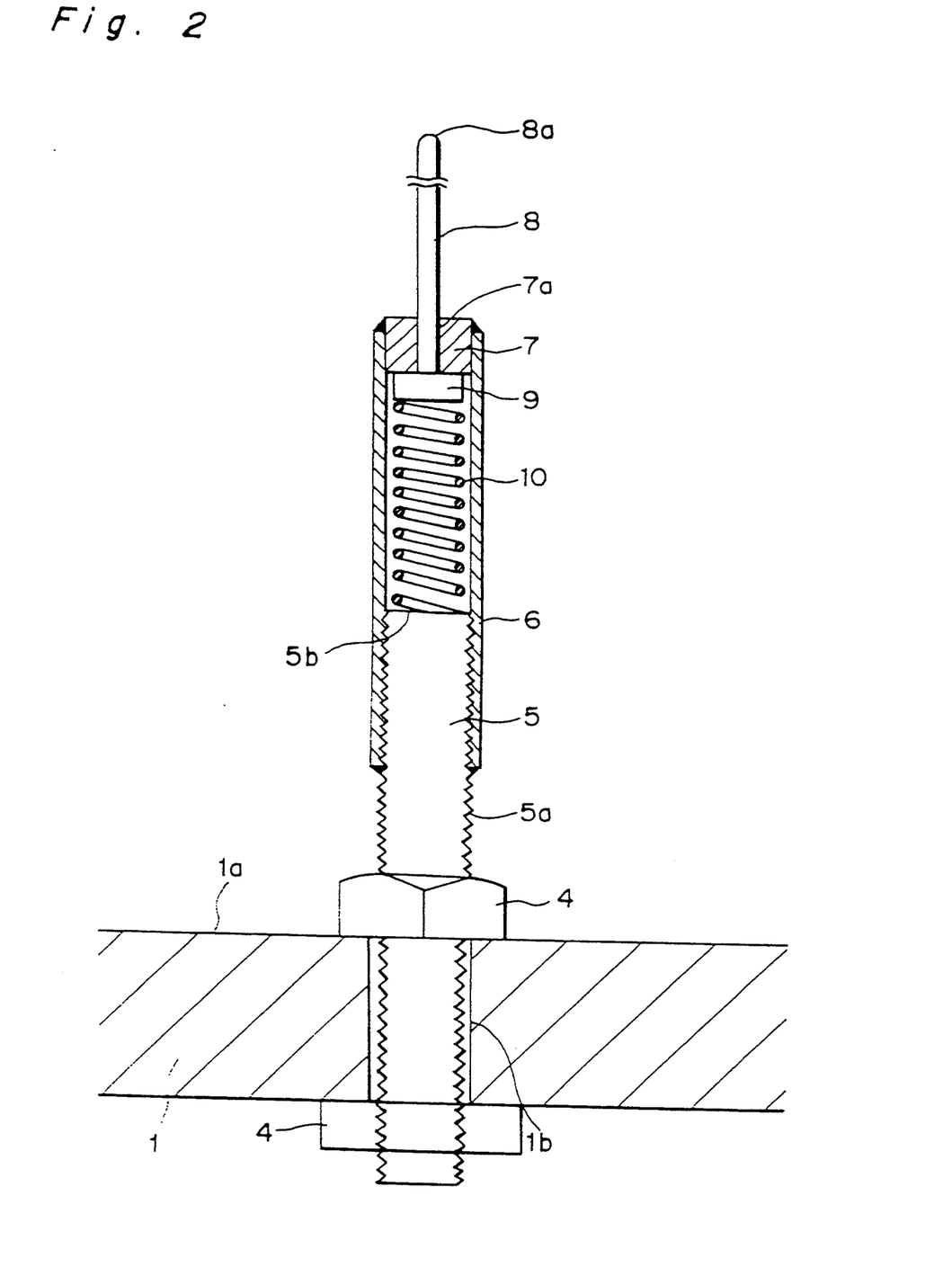
FIG. 2 is a sectional view showing a wiring guide rod according to the assembling jig of FIG. 1.

The construction of the wiring guide jig 3 is as shown in FIG. 2. That is, the wiring guide jig 3 comprises a supporting rod 5; a guide cylinder 6; a closing cover 7; a wiring guide rod 8; a stopper 9; and a compression spring serving as an elastic member. More specifically, a thread 5a formed on the surface of the supporting rod 5 is screwed into a nut 4 fixed to the upper and lower surfaces of an installing opening 1b formed on a predetermined position of the wiring base 1, with the supporting rod 5 inserted through the opening 1b. The supporting rod 5 is inserted into the annular guide cylinder 6 to fix the guide cylinder 6 to the upper portion of the supporting rod 5 so as to project the guide cylinder 6 upward from the supporting rod 5. The closing cover 7, having a guide opening 7a in the center thereof, is fixed to the guide cylinder 6 so as to cover the open space in the upper end of the guide cylinder 6. The wiring guide rod 8 moves vertically in sliding contact with the guide opening 7a of the closing cover 7. The stopper 9 is fixed to the lower end surface of the wiring guide rod 8 and moves vertically in sliding contact with the inner peripheral surface of the guide cylinder 6. The spring 10 is mounted on the lower end surface of the stopper 9 and the upper end surface 5b of the supporting rod 5 positioned in the guide cylinder 6.

In the jig 3, the wiring guide rod 8 is urged by the spring 10, thus projecting in a predetermined distance from the closing cover 7. When the wiring guide rod 8 is pressed downward, the wiring guide rod 8 moves downward against the urging force of the spring 10. The stroke of the downward movement of the wiring guide rod 8 is set to be a distance necessary enough for a protector cover to be installed on a protector case.

Figure 1:
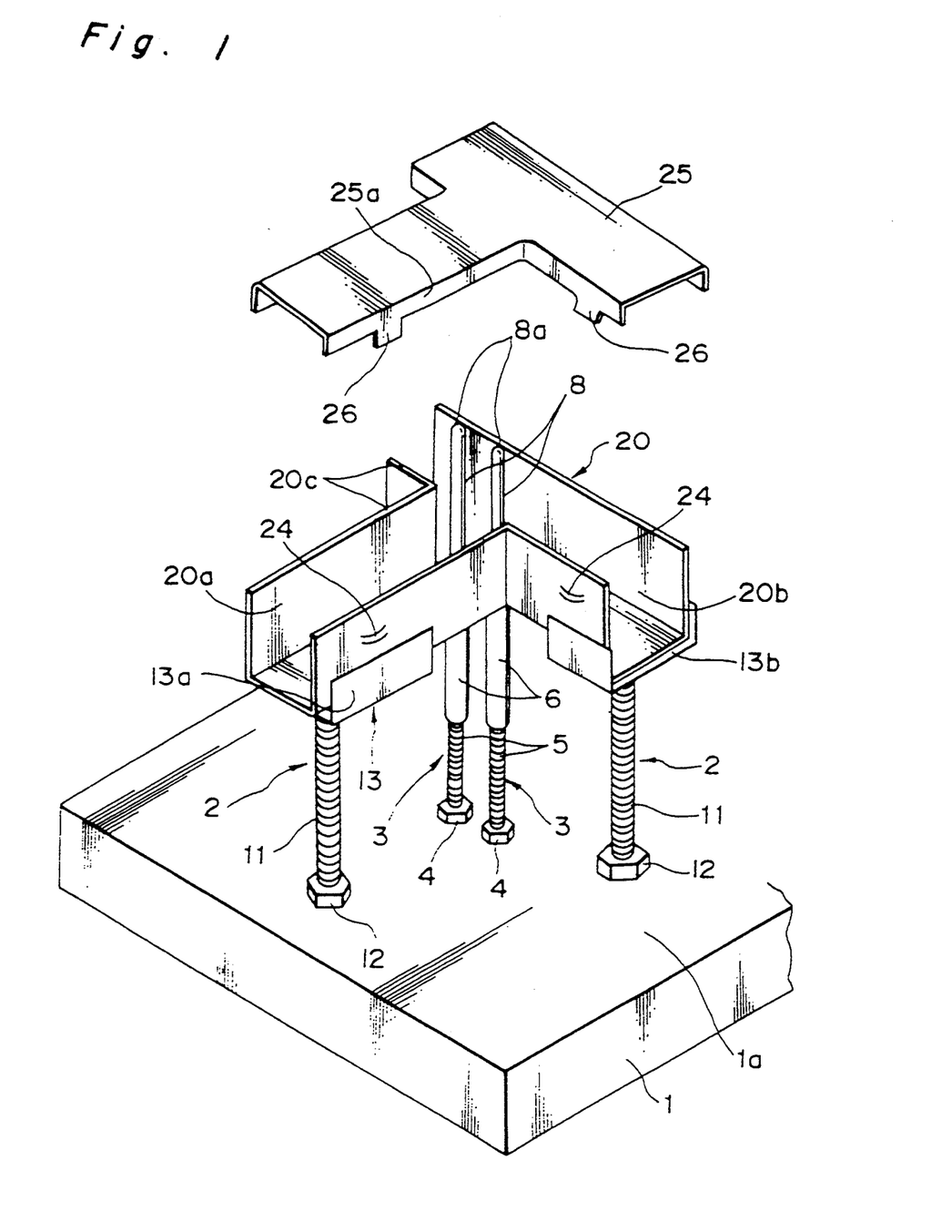
FIG. 1 is a perspective view showing an assembling jig according to an embodiment of the present invention.

The protector (cover)-fixing jig 2 comprises a supporting rod 11, similar to the supporting rod 5, fixed to the wiring base 1 by nuts 12 disposed on the upper and lower surfaces of the wiring base 1; and a U-shaped case holder 13 fixed to the upper end of the supporting rod 11. A U-shaped protector case 20 is removably held on the case holder 13.

The protector (cover)-installing jig of this embodiment is used to install the protector cover on the protector case so as to cover a T-shaped wire harness comprising electric wires. Therefore, as shown in FIG. 1, the protector case 20 is T-shaped. That is, the protector case 20 comprises a lengthwise portion 20a and a widthwise portion 20b. Thus, the case holder 13 for holding the protector case 20 comprises a lengthwise portion 13a and a widthwise portion 13b supported by the supporting rod 11.

The protector case 20 has two through-holes (not shown) formed at the intersection of the lengthwise portion 20a of the protector case 20 and the widthwise portion 20b thereof. The two through-holes are formed to insert the wiring guide rod 8 therethrough. The wiring guide rod 8 is urged by the spring 10 and thus, the upper end 8a of the wiring guide rod 8 is located above the upper end surface 20c of the protector case 20. When the upper end 8a of the wiring guide rod 8 is pressed downward, the wiring guide rod 8 is moved downward and thus the upper end 8a is located below the upper end surface 20c.

Locking portions 24 for locking the protector cover 25 are formed on the peripheral surface of side walls of the protector case 20 such that the locking portions 24 are disposed high above the upper end of the case holder 13.

Similarly to the protector case 20, the protector cover 25 is T-shaped, thus covering the upper open space of the protector case 20. Each locking portion 24 removably engages each of corresponding projections 26 formed on the lower end of side walls 25a of the protector cover 20 when the side walls 25a are brought into contact with the side walls of the protector case 20.

Figure 3:
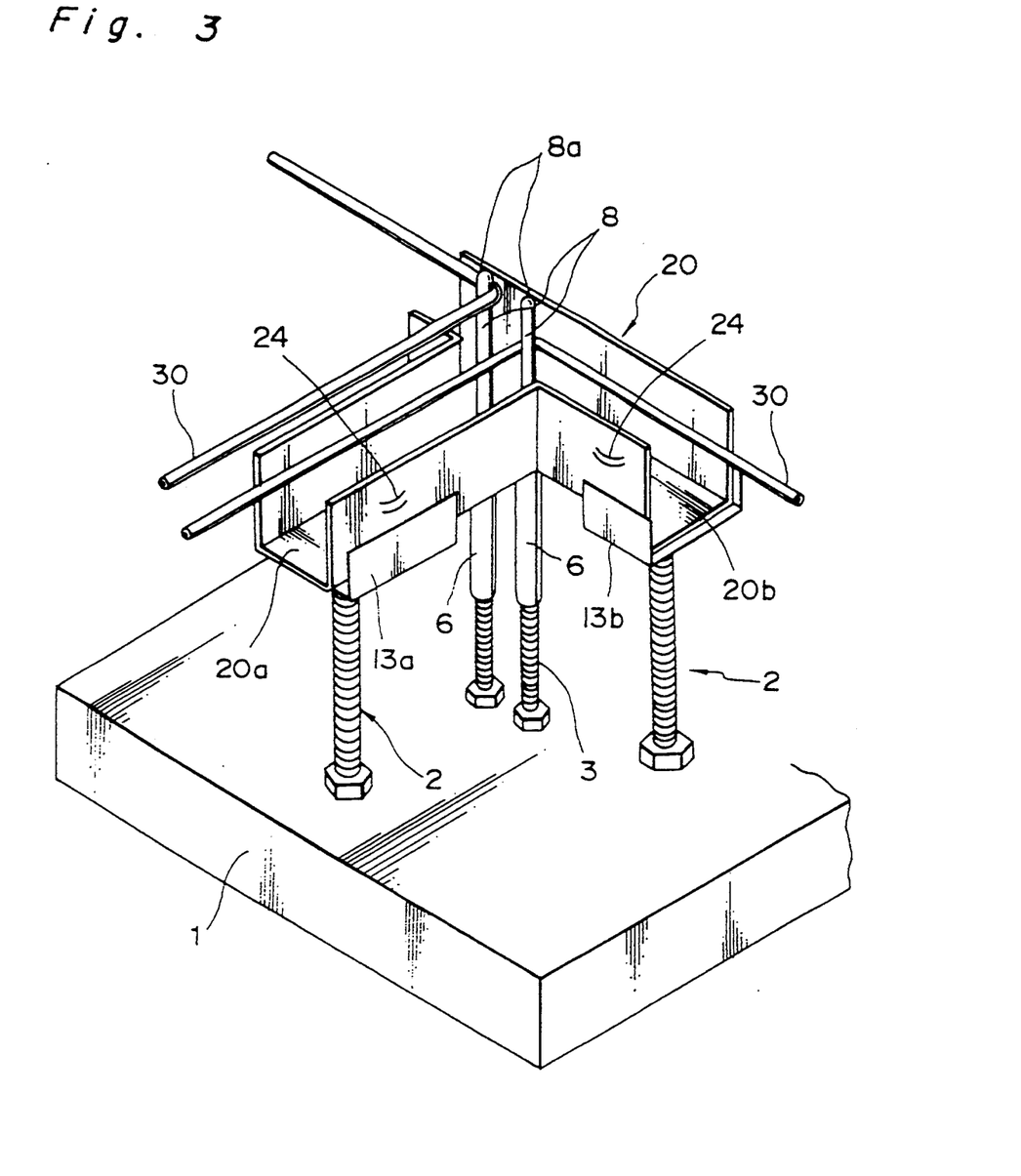
FIG. 3 is a perspective view showing the use state of the assembling jig of FIG. 1.
Figure 4:
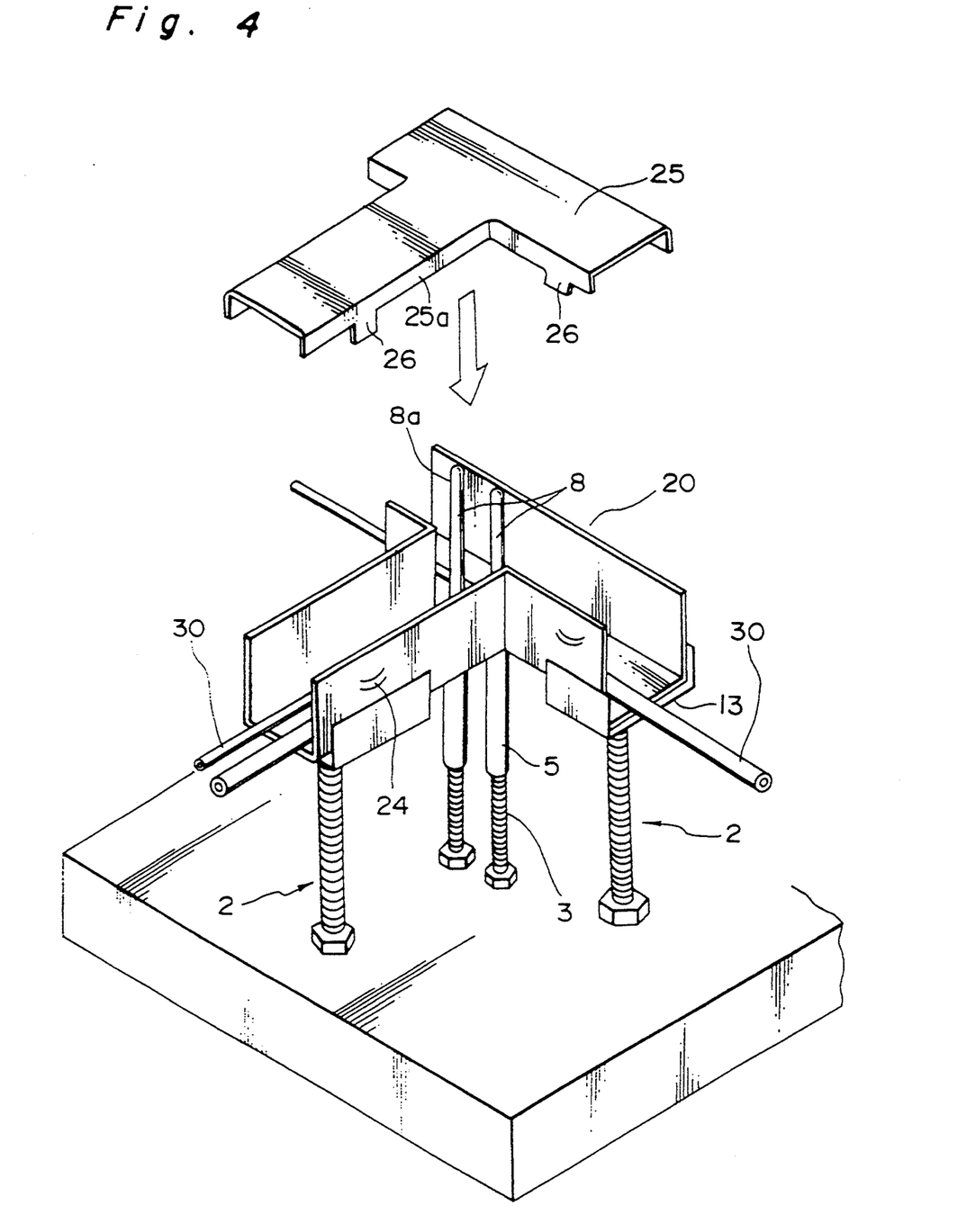
FIG. 4 is a perspective view showing the use state of the assembling jig of FIG. 1.

Referring to FIGS. 3 and 4, the operation of wiring electric wires and installing the protector cover 25 on the protector case 20 by means of the protector (cover)-installing jig are described below.

Referring to FIG. 3, a wire harness 30 is wired in the configuration of T by bending, at the wiring guide rod 8, the wire harness 30 extending lengthwise along the lengthwise portion 20a of the protector case 20 so as to extend it widthwise along the widthwise portion 20b of the protector case 20. Thus, the wire harness 30 can be wired easily in the protector case 20.

When the wire harness 30 has been provided along the wiring guide rod 8, the wire harness 30 falls by its weight and looosing into the protector case 20 along the wiring guide rod 8 and is accommodated in the protector case 20 as shown in FIG. 4.

Then, an operator places the protector cover 25 on the wiring guide rod 8 and presses the protector cover 25 downward to mount the protector cover 25 on the protector case 20 held by the case holder 13.

As a result, the wiring guide rod 8 is moved downward against the urging force of the spring 10 and as a result, the upper end 8a of the wiring guide rod 8 is located below the upper end surface 20c of the protector case 20.

In this manner, the protector cover 25 can be placed on the upper end surface 20c of the protector case 20 with the side wall 25a of the protector cover 25 and the side wall of the protector case 20 in contact with each other. Then, the projection 26 of the protector cover 25 is engaged by the locking portion 24. In this manner, the protector cover 25 is installed on the protector case 20. The locking operation can be performed without removing the protector case 20 from the jig because the locking portion 24 is disposed high above the upper end of the case holder 13.

FIGS. 5A, 5B, 5C, 6A, 6B, and 6C show wiring guide jigs according to other embodiments of the wiring guide jig.

Figure 5A:
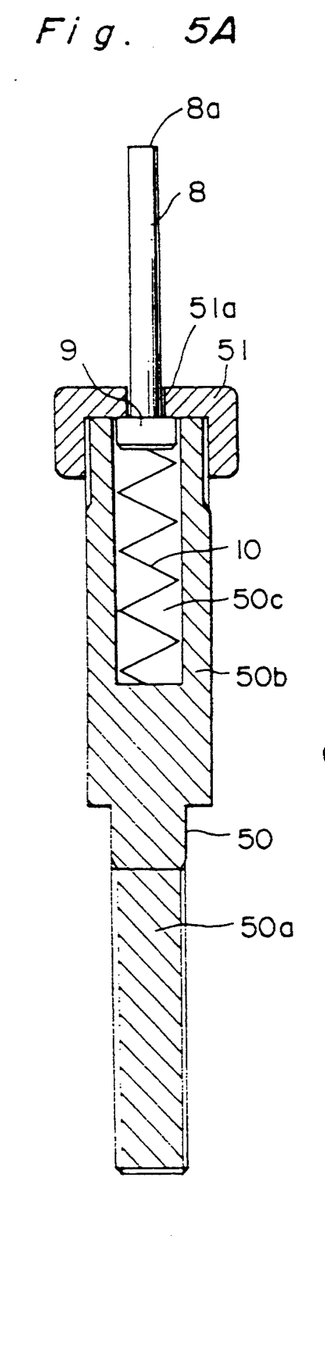
FIGS. 5A, 5B, and 5C are sectional views showing wiring guide rods according to embodiments of the present invention.
Figure 5B:
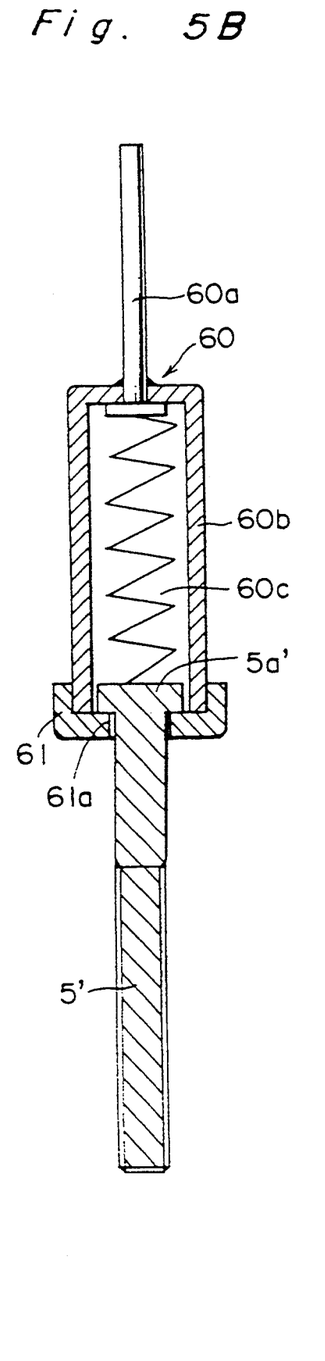
Figure 5C:
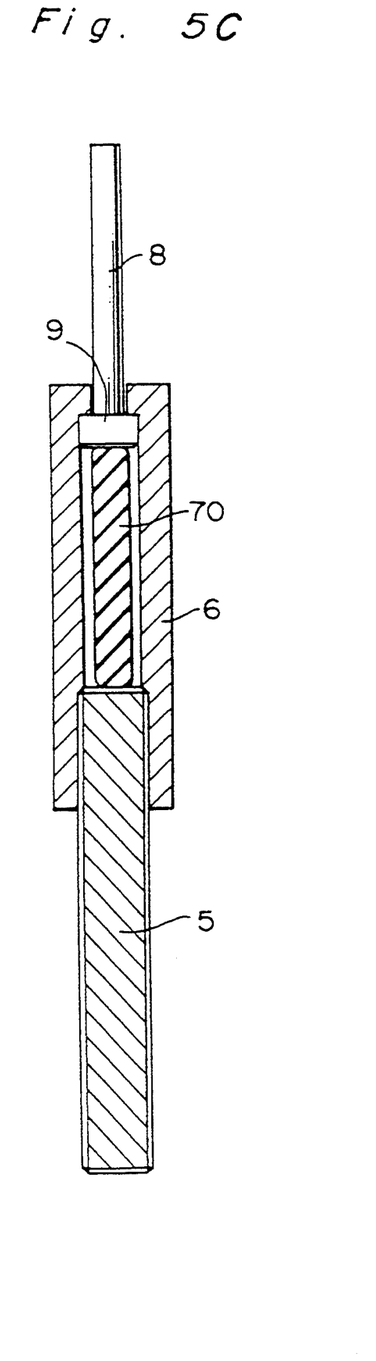

In the embodiments shown by FIGS. 5A, 5B, and 5C, the construction of the supporting rod, the guide cylinder, the wiring guide rod, and the elastic member for urging the wiring guide rod is different from that of the above-described embodiment.

In the embodiment shown in FIG. 5A, the supporting rod and the guide cylinder are integrated with each other. A supporting rod/guide cylinder 50 comprises a supporting rod portion 50a and a guide cylinder portion 50b disposed above the supporting rod portion 50a. A hollow opening 50c, the upper end of which is open is formed in the guide cylinder portion 50b. The lower portion of the wiring guide rod 8 is inserted downward into the hollow opening 50c and then, the closing cover 51 is removably mounted on the guide cylinder portion 50b. The closing cover 51 has a through-hole 51a formed in the center thereof so that the wiring guide rod 8 is inserted therethrough. The stopper 9 disposed at the lower end of the wiring guide rod 8 is mounted on the upper end of the spring 10 so that the stopper 9 is vertically movable in the hollow opening 50c. The spring 10 is disposed between the lower end surface of the stopper 9 and the lower end surface of the hollow opening 50c.

In this embodiment, when the upper end 8a of the wiring guide rod 8 is pressed downward by the protector cover 25, the wiring guide rod 8 moves downward in the hollow opening 50c of the guide cylinder portion 50b.

In the embodiment shown in FIG. 5B, the guide cylinder and the wiring guide rod are integrated with each other. An annular guide cylinder portion 60b is welded to the lower end of a wiring guide rod portion 60a so as to form a guide cylinder/wiring guide rod 60. The compression spring 10 is inserted into the hollow opening 60c of the guide cylinder portion 60b from an opening formed at the lower end of the guide cylinder portion 60b. Then, the head (stopper) 5a' of the supporting rod 5' of a large diameter is inserted into the hollow opening 60c from the opening of the guide cylinder portion 60b. Then, a plate 61 having a through-hole 61a formed thereon is fixed to the lower end of the guide cylinder portion 60b. The diameter of the through-hole 61a is greater than that of the supporting rod 5' so that the guide cylinder/wiring guide rod 60 integrated with the plate 61 moves vertically along the supporting rod 5'.

The construction of the wiring guide jig shown in FIG. 5C is similar to that of the wiring guide jig shown in FIG. 2. The guide cylinder 6 is fixed to the upper end of the supporting rod 5. The lower end of the wiring guide rod 8, namely, the stopper 9 is inserted into the guide cylinder 6 from the opening disposed at the upper end of the guide cylinder 6. Instead of the compression spring 10, a cylindrical urethane rubber 70 is interposed between the stopper 9 and the upper surface of the supporting rod 5.

The urethane rubber 70 is in contact with the lower end surface of the stopper 9, thus urging the wiring guide rod 8 upward. In mounting the protector cover 25 on the protector case 20, the urethane rubber 70 is compressed a predetermined distance. As a result, the wiring guide rod 8 is moved the predetermined distance downward.

An air cylinder may be used to urge the wiring guide rod 8 upward in addition to the compression spring and elastic rubber comprising urethane.

There is a possibility that when the wiring guide rod 8 is pressed downward by the protector cover 25, the wiring guide rod 8 is inclined by the tensile force of the wired wire harness 30 and as a result, the wiring guide rod 8 is prevented from smoothly moving downward. The wiring guide jigs according to the embodiments shown in FIGS. 6A, 6B, and 6C prevent the inclination of the wiring guide rod 8.

Figure 6A:
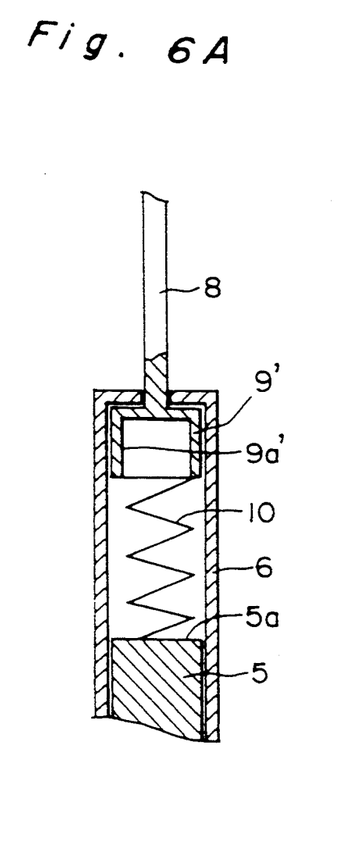
FIGS. 6A, 6B, and 6C are sectional views showing wiring guide rods according to embodiments of the present invention.

In the embodiment shown in FIG. 6A, a cylindrical stopper 9' formed at the lower end of the wiring guide rod 8 is inserted into the guide cylinder 6. The stopper 9' moves vertically with the peripheral surface of the cylindrical portion 9a' thereof in sliding contact with the inner peripheral surface of the guide cylinder 6. Accordingly, the stopper 9' and the wiring guide rod 8 move vertically without inclining.

Figure 6B:
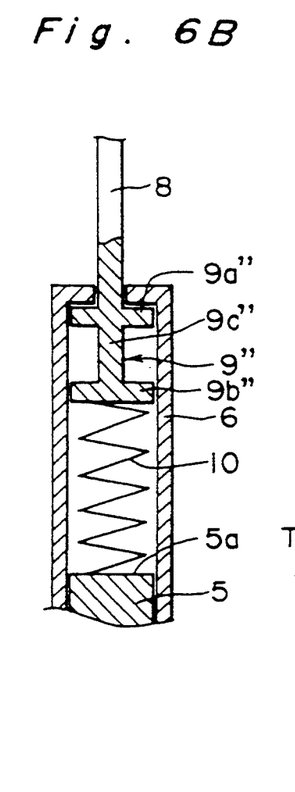

In the embodiment shown in FIG. 6B, a stopper 9" comprises two disks 9a" and 9b" which are brought into contact with the inner peripheral surface of the guide cylinder 6 and a shaft 9c" disposed between the two disks 9a" and 9b". Since the peripheral surface of the two disks 9a" and 9b" are in contact with the inner peripheral surface of the guide cylinder 6, the stopper 9" does not incline and thus the wiring guide rod 8 is prevented from inclining.

Figure 6C:
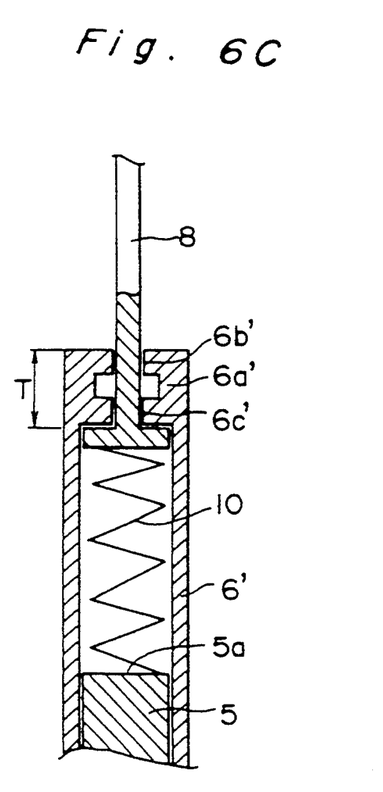

In the embodiment shown in FIG. 6C, the configuration of the stopper 9 is similar to that shown in FIG. 2. The vertical thickness T of a closing cover 6a" mounted on the upper open end of the guide cylinder 6' is set to be great. Two openings 6b' and 6c' are formed on the closing cover 6a' so as to support the wiring guide rod 8 at two points. Accordingly, the wiring guide rod 8 is prevented from inclining in moving downward in contact with the inner peripheral surface of the two openings 6b' and 6c'.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A jig combination for assembling a wire harness comprising a wiring guide rod and protector-fixing jig being disposed on a wiring base, said protector-fixing jig supporting a protector case, said wiring guide rod being inserted into the protector case from an opening formed in the protector case, said protector case being removably held by the protector-fixing jig, the wiring guide rod being elastically supported to project an upper end portion of the wiring guide rod from an upper surface of the protector case, said wiring guide rod being moved downward to locate the upper end of the wiring guide rod below an upper surface of the protector case when the wiring guide rod is pressed downward by a protector cover in installing the protector cover on the protector case in which electric wires of the wiring harness have been assembled.

2. The jig combination as defined in claim 1, wherein a guide cylinder and the wiring guide rod are integrated with each other, the guide cylinder being on a supporting rod so that the guide cylinder moves in sliding contact with the supporting rod, an elastic member being interposed between the wiring guide rod integrated with the guide cylinder and the supporting rod so that the elastic member urges the wiring guide rod integrated with the guide cylinder, the wiring guide rod integrated with the guide cylinder being moved downward when the wiring guide rod is pressed downward by the protector cover in installing the protector cover on the protector case.

3. The jig combination as defined in claim 2, wherein the elastic member urges the wiring guide rod upward, thus disposing the upper end of the wiring guide rod above an upper end surface of the protector case, and when the wiring guide rod is moved downward by a force applied to a protector cover in installing the protector cover on the protector case, the upper end of the wiring guide rod is positioned below an upper end surface of the protector case.

4. The jig combination as defined in claim 1, wherein a sliding guide portion is formed on the lower end of the wiring guide rod, the provision of the sliding guide portion allowing the wiring guide rod to move downward without being inclined in sliding contact with the inner peripheral surface of the guide cylinder.

5. The jig combination as defined in claim 4, wherein the upper portion of the guide cylinder includes two vertically spaced openings, said sliding guide portion of said wiring guide rod extending through the two openings, and wherein the two openings and the sliding guide portion prevent the wiring guide rod from inclining in a downward movement thereof in sliding contact with an inner peripheral surface of the two openings.

6. The jig combination as defined in claim 1, wherein the wiring guide rod projecting from an upper end surface of the protector case is designed to move downward by the force applied to the protector cover in installing the protector cover on the protector case, and the protector cover is installed on the protector case without removing the protector case from the protector-fixing jig.

7. A jig combination for assembling a wire harness comprising a wiring guide rod and protector-fixing jig being disposed on a wiring base, said wiring guide rod being inserted into a protector case from an opening formed in the protector case, said protector case being removably held by the protector-fixing jig, wherein the wiring guide rod is elastically supported to project an upper end portion of the wiring guide rod from an upper surface of the protector case, said wiring guide rod being moved downward to locate the upper end of the wiring guide rod below an upper surface of the protector case when the wiring guide rod is moved downward by a force applied to a protector cover in installing a protector cover on the protector case in which electric wires of the wiring harness have been assembled.

* * * * *